United States Patent [19]
Higuchi et al.

[11] Patent Number: 6,033,043
[45] Date of Patent: Mar. 7, 2000

[54] CRAWLER TYPE DRIVE APPARATUS

[75] Inventors: Takeshi Higuchi, Ishioka; Hiroyuki Nishimori, Chiyoda-machi, both of Japan

[73] Assignee: Hitachi Construction Machinery Co., Ltd., Tokyo, Japan

[21] Appl. No.: 08/894,244

[22] PCT Filed: Dec. 24, 1996

[86] PCT No.: PCT/JP96/03758

§ 371 Date: Jul. 14, 1997

§ 102(e) Date: Jul. 14, 1997

[87] PCT Pub. No.: WO97/24250

PCT Pub. Date: Jul. 10, 1997

[30] Foreign Application Priority Data

Dec. 27, 1995 [JP] Japan .................................. 7-354494
Nov. 7, 1996 [JP] Japan .................................. 8-311483

[51] Int. Cl.[7] .......................... B62D 55/12; B62D 55/18
[52] U.S. Cl. ............................................. 305/116; 305/139
[58] Field of Search .................................... 305/116, 139

[56] References Cited

U.S. PATENT DOCUMENTS

| 1,946,660 | 2/1934 | Baker ........................................ 305/139 |
| 4,191,431 | 3/1980 | Roley ........................................ 305/123 |
| 4,402,555 | 9/1983 | Ogaki ........................................ 305/102 |

FOREIGN PATENT DOCUMENTS

| 50-105132 | 8/1975 | Japan . |
| 50-133635 | 11/1975 | Japan . |
| 52-61817 | 5/1977 | Japan . |
| 55-127678 | 9/1980 | Japan . |
| 58-106027 | 6/1983 | Japan . |
| 62-47484 | 3/1987 | Japan . |
| 63-182921 | 11/1988 | Japan . |
| 3-64187 | 6/1991 | Japan . |
| 4-100973 | 9/1992 | Japan . |
| 6-6182 | 1/1994 | Japan . |

*Primary Examiner*—J. J. Swann
*Assistant Examiner*—Andrew J. Ririe
*Attorney, Agent, or Firm*—Antonelli, Terry, Stout & Kraus, LLP

[57] ABSTRACT

This invention is to suppress repeated striking noises as generated by a crawler belt (29) when taken up onto a drive sprocket (25) in a polygonally bent shape. A crawler belt support block (34) is fixedly mounted on top of an upper reinforcing plate (19) of a bracket (15) on the side of the drive sprocket. The crawler belt support block (34) includes a skid block (36) with a crawler belt sliding surface (36B) to be held in sliding contact with lower surfaces of respective links (30) of the crawler belt (29) to guide same in a direction tangential of the drive sprocket (25) when the crawler belt (29) is taken up onto the drive sprocket (25). The crawler belt support block suppresses vertical movements as would occur to the crawler belt (29) when taken up onto the drive sprocket (25) in a polygonally bent shape, to reduce the repeated striking noises generated by meshing engagement of bushes (32) of the crawler belt (29) and the drive sprocket (25).

7 Claims, 12 Drawing Sheets

CRAWLER TYPE DRIVE APPARATUS

BACKGROUND OF THE INVENTION

This invention relates to a crawler type drive apparatus which is suitable for application as a vehicular base carrier for various crawler type construction machines such as hydraulic power shovels, hydraulic cranes and the like.

Normally, construction machines such as hydraulic power shovels and hydraulic cranes, which are required to run on rough and muddy terrains of construction sites are equipped with a crawler type drive apparatus.

Crawler type drive apparatus of this sort generally include a truck frame having a pair of side frames at the opposite lateral sides of a center frame, front and rear brackets provided at the front and rear ends of each side frame for supporting thereon a drive sprocket and an idler wheel or vice versa, and a crawler belt wrapped between and around the drive sprocket and idler wheel. Upon rotationally driving the drive sprocket, the crawler belt, which is meshed with the drive sprocket, is driven by the drive sprocket to turn over around the drive sprocket and idler wheel via guide rollers, which are provided between the drive sprocket and idler wheels, putting the base carrier of a vehicle in travel.

In this connection, it has been well known in the art that, when put in travel, the vehicular base carrier with crawlers of this sort generates loud percussive or striking noises as crawler belts are turned around between the drive sprocket and idler wheel. These noises can be largely classified into intermittent striking noises and continuous striking sounds. Of these two kinds of noises, the intermittent percussive noises are attributable to undulatory vibrations which occur to each crawler belt which is turning around between the drive sprocket and upper rollers, causing the crawler belt to hit itself intermittently against the drive sprocket and idler wheel. On the other hand, the continuous striking noises are produced by a large number of crawler belt links as they are successively taken up onto the drive sprockets and meshed therewith in a polygonally bent shape.

In this regard, Japanese Laid-Open Utility Model Application 55-127678, 63-182981 and 6-6182 disclose crawler type vehicular drive apparatus employing guide roller bodies which are arranged to support lower side of a crawler belt between an upper roller and a drive sprocket. According to the crawler type drive apparatus described in these publications, by the provision of guide rollers which support lower side of a crawler belt, it becomes possible to suppress undulatory vibrations of the crawler belt between the upper roller and drive sprocket and thereby to minimize the intermittent striking noises as would be generated at a louder level by the undulatory vibrations.

However, although the crawler type drive apparatus of the above-mentioned prior art can reduce the intermittent striking noises as caused by undulatory vibrations of the crawler belt, there still remains the problem of continuous percussive or striking noises which are generated by the respective links of crawler belts when they are successively taken up onto the drive sprocket in a polygonally bent shape as mentioned hereinbefore.

Figure 11:
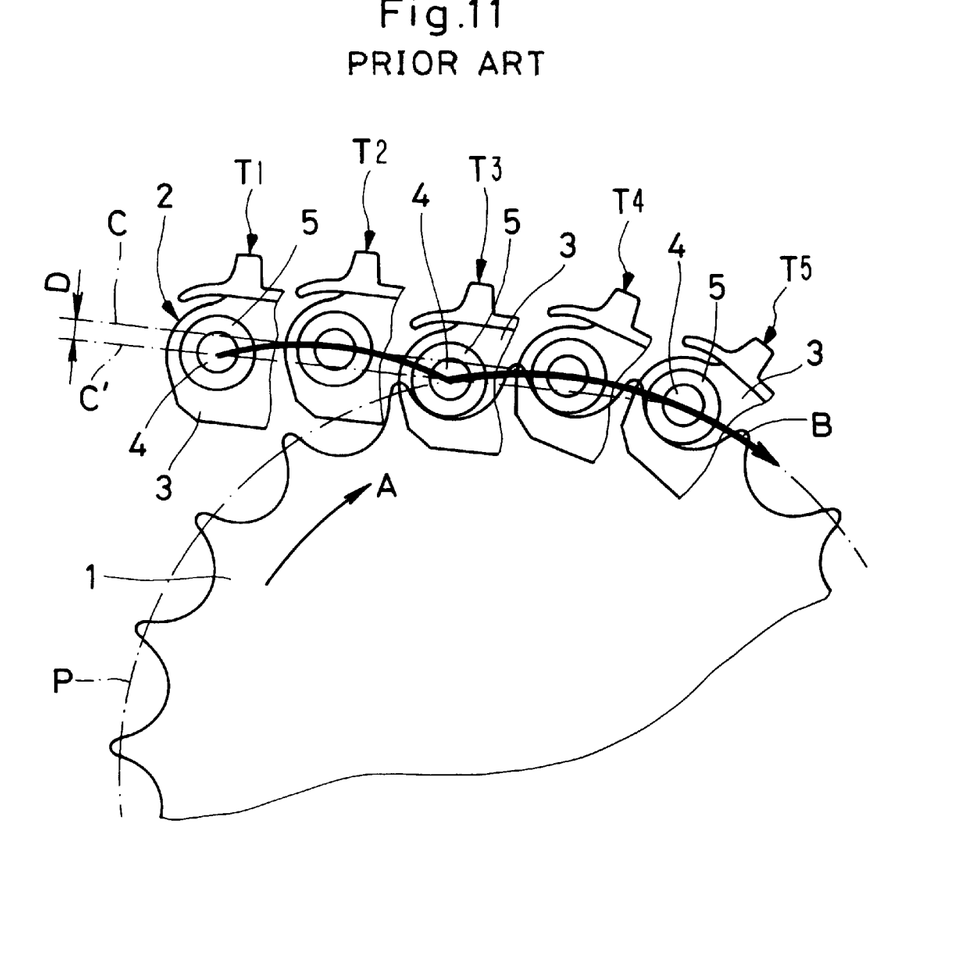
FIG. 11 is a schematic illustration explanatory of a manner in which links of a crawler belt are successively taken up onto a drive sprocket on a prior art crawler type drive apparatus.

Here, a reference is had to FIG. 11 to explain the reason why continuous striking noises are produced by a crawler belt when it is taken up onto a drive sprocket.

In FIG. 11, indicated at 1 is a drive sprocket, and at 2 a crawler belt which is passed around the drive sprocket 1 and an idler wheel (not shown). The crawler belt 2 is formed by successively connecting a plural number of links 3 pivotally by the use of connecting pins 4, which are each fitted with a bush 5. As the drive sprocket 1 is put in rotation in the direction of arrow A, the bushes 5 on the crawler belt 2 are successively meshed with the drive sprocket 1 as the links 3 are taken up onto the drive sprocket 1 progressively from time point T1 to T5.

In this instance, the links 3 are taken up onto the drive sprocket 1 in a polygonally bent shape, so that the bushes 5 are moved in the arrowed direction along a locus of movement as indicated by a curve B. At this time, a straight line C which is drawn through the centers of the bushes 5 at time points T2 and T4 lies on a line C which is tangential of pitch circle P of the drive sprocket 1. On the other hand, a straight line C' which is drawn through the centers of the bushes 5 at time points T1, T3 and T5 is downwardly deviated from the tangential line C by a deviational displacement D.

As a consequence, a bush 5 which is coming into meshing engagement with the drive sprocket 1 at time point T3 is vertically displaced by the deviational displacement D during movement from time point T2 to T3 and violently hit against the drive sprocket 1. It is considered that this phenomenon is repeated when the links 3 are successively taken up onto the drive sprocket 1, thereby producing continuous or repeated striking noises.

In this regard, attempts have been made to reduce such continuous striking noises which occur when crawler belt links are successively taken up onto a drive sprocket in a polygonally bent shape, for example, as disclosed in Japanese Laid-Open Utility Model Application 4-100973 and 50-133635, which disclose crawler belt type drive apparatus employing a crawler belt support structure between an upper guide roller and a drive sprocket in such a way as to support a crawler belt from beneath.

However, in the case of the above-mentioned Laid-Open Utility Model Application 4-100973, the crawler belt support is constituted by a truck frame boss which is provided on a truck frame in a position between an upper guide roller and a drive sprocket, a support bracket member which is erected on the truck frame boss, and a guide roller body which is supported on the support bracket member for rotation about a horizontal axis. Therefore, the crawler belt support requires a large number of parts, which will be naturally reflected by an increased production cost of the crawler type drive apparatus as a whole and also by a higher frequency of replacements of worn-out guide roller body, which is a quite troublesome job.

On the other hand, the crawler belt support according to the above-mentioned Japanese Laid-Open Utility Model Application 50-133635 is constituted by a support bracket member erected on a truck frame, an elongated holder plate securely fixed on the support bracket member and extended to hang over on the side of a drive sprocket, and an elongated slide plate fixedly mounted on the holder plate through a buffer material. In this case, the crawler belt support is also made up of a large number of parts and, additionally, bulky in size to such a degree as will necessarily result in higher production cost of the crawler type drive apparatus as a whole.

Besides, the slide plate which constitutes part of the crawler belt support is located in a position relatively distant from a meshing position where the crawler belt comes into meshing engagement with the drive sprocket, so that it fails to suppress sufficiently the continues striking noises which occur when the crawler belt is taken up onto the drive sprocket for meshing engagement therewith.

Figure 12:
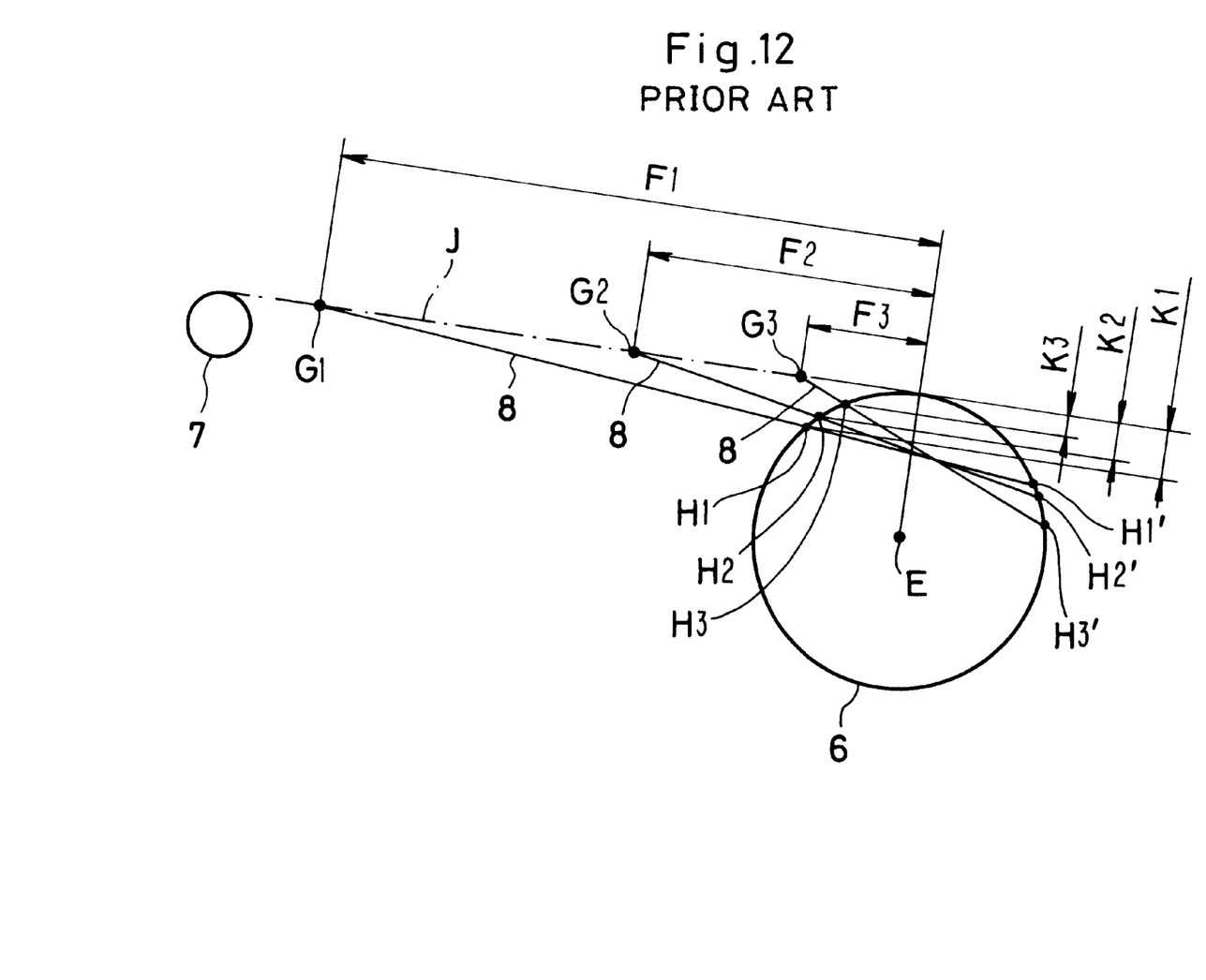
FIG. 12 is a schematic illustration explanatory of relations between a position of a crawler belt support member and a meshing position of a crawler belt with a drive sprocket in a prior art crawler type drive apparatus.

Here, reference is had to FIG. 12 to explain the reasons why continuous striking noises are generated by the crawler belt and drive sprocket in a louder level are explained, in case a slide plate of a crawler belt support structure is located at a distant position from the drive sprocket as in the above-mentioned Japanese Laid-Open Utility Model Application 50-133635.

In FIG. 12, denoted at 6 is a drive sprocket, at 7 an upper roller, and at 8 a crawler belt. This figure shows how the meshing point of the crawler belt 8 with the drive sprocket 6 changes when the position of the crawler belt 8 is shifted between the drive sprocket 6 and the upper roller 7.

In this instance, when a crawler belt support is located in a position which is spaced from the rotational axis E of the drive sprocket 6 by a distance F1, the crawler belt 8 and drive sprocket 6 are meshed with each other from position H1 to position H1'. However, it is to be noted that the initial meshing position H1 is deviated to a lower position by a displacement K1 from a tangential line J which connects the drive sprocket 6 and the upper roller 7. Further, in case a crawler belt support is located in a position G2 which is spaced from the rotational axis E by a distance F2, the crawler belt 8 and drive sprocket 6 are meshed with each other from position H2 to position H2'. In this case, the meshing position H2 is deviated downward of the tangential line J by a displacement K2. Furthermore, in case a crawler belt holder is located at a position G3 which is spaced from the rotational axis E by a distance F3, the crawler belt 8 and drive sprocket 6 are meshed with each other from position H3 to position H3'. In this case, the meshing position H3 is deviated downward of the tangential line J by a displacement K3.

In this manner, the displacement K of the meshing position H of the crawler belt 8 and drive sprocket 6 from the tangential line J becomes larger with increases in the distance of the location G of the crawler belt support from the drive sprocket 6. The greater the displacement K, the greater becomes the energy necessary for the drive sprocket 6 to kick up the crawler belt 8 at the time of meshing engagement therewith. Namely, the louder continuous striking noises are produced by meshing engagement of the crawler belt 8 and the drive sprocket 6.

Accordingly, it is desirable to locate the crawler belt support as closely to the drive sprocket as possible and in such a way that the crawler belt 8 is taken up onto the drive sprocket 6 from a tangential direction. Nevertheless, the above-described prior art crawler belt support is located in a distant position from the drive sprocket, failing to suppress to a satisfactory degree the continues striking noises as occurring when the crawler belt is continuously meshed with the drive sprocket.

In view of the problems inherent to the prior art as discussed above, it is an object of the present invention to provide a crawler type drive apparatus which can securely suppress continuous percussive or striking noises as would be generated by a crawler belt when taken up onto a drive sprocket in a polygonally bent shape, and which is simplified in construction.

BRIEF SUMMARY OF THE INVENTION

According to the present invention, in order to achieve the above-stated objective, there is provided a crawler type drive apparatus suitable for application to a vehicular base carrier of the sort which basically includes a truck frame having a pair of side frames at opposite lateral sides of a center frame, first and second brackets provided at the fore and rear ends of each side frame for supporting a sprocket wheel and an idler wheel or vice versa, and a crawler belt endlessly wrapped around the drive sprocket and the idler wheel.

According to a feature of the present invention, the crawler type drive apparatus is provided with a crawler belt support block which is fixedly mounted on top of the first bracket on the side of the drive sprocket and in a position in the proximity of the drive sprocket, the crawler belt support block including a block body with a crawler belt sliding surface to be held in sliding contact with the crawler belt.

With the arrangements just described, the crawler belt which is driven to turn around and between the drive sprocket and idler wheel is kept in sliding contact with the crawler belt sliding surface of the crawler belt support block provided on the first bracket on the side of the drive sprocket as it is taken up onto the drive sprocket. At this time, the crawler belt support block functions to guide the crawler belt to meet the drive sprocket from a tangential direction relative to the latter, thereby suppressing vertical movements as would occur to the crawler belt when taken up onto the drive sprocket in a polygonally bent shape and suppressing continuous percussive or striking noises generated by continuous meshing engagement of the crawler belt and the drive sprocket.

According to another feature of the present invention, the first bracket on the side of the drive sprocket is constituted by a mount plate for mounting a drive mechanism for the drive sprocket and a reinforcing plate located around the outer periphery of the mount plate for reinforcing purposes, and the crawler belt support block is securely fixed in position on top of the reinforcing plate of the first bracket.

With the arrangements just described, the crawler belt support block can be located in the proximity of the drive sprocket to guide the crawler belt in a tangential direction by sliding contact with the crawler belt sliding surface of the support block up to a point immediately upstream of an initial meshing position where the crawler belt is taken up onto the drive sprocket.

According to still another feature of the present invention, the crawler belt support block is constituted by a base block member securely fixed on the first bracket on the side of the drive sprocket and a skid block in the form of a singular rigid body detachably fastened to the base block member by suitable fastening means and having a crawler belt sliding surface for sliding contact with the crawler belt.

With the arrangements just described, the crawler belt support block can be simplified in construction and can be handled easily, for example, at the time of replacement of a worn-out skid block. In addition, the use of the skid block in the form of a single rigid body makes it possible to downsize the crawler belt block as a whole and to locate same in the proximity of the drive sprocket.

Further, according to the present invention, the crawler belt sliding surface of the crawler belt support block is formed substantially parallel with a straight line which is disposed tangential of the drive sprocket to guide the crawler belt therealong until taken up onto the drive sprocket.

With the arrangements just described, it becomes possible to hold the crawler belt in sliding contact with the crawler belt sliding surface on the support block and to guide the crawler belt in a tangential direction relative to the drive sprocket up to a point where the crawler belt is taken up onto the drive sprocket.

Further, according to the present invention, a sprocketside end of the crawler belt support block is located with a spacing distance in the range of 0.25 to 1 time the pitch of crawler belt links from a straight line passing through center axis of the drive sprocket perpendicularly to a travel direction of the crawler belt being tangentially taken up onto the drive sprocket.

With the arrangements just described, the crawler belt support block which is located in a position extremely in the proximity of the drive sprocket can guide the crawler belt almost up to a point where the crawler belt is taken up onto the drive sprocket, thereby securely suppressing vertical movements which would otherwise occur to the crawler belt as it is taken up onto the drive sprocket in a polygonally bent shape.

Furthermore, according to the present invention, the crawler belt support block is located on top of the first bracket on the side of the drive sprocket and in a position in the proximity of the drive sprocket, the crawler belt support block having a block body with a crawler belt sliding surface which receive vertical movements of the respective links of the crawler belt while guiding the crawler belt links smoothly therealong.

With the arrangements just described, the crawler belt can be received in vertical movements by engagement with the crawler belt sliding surface on the support block, thereby smoothly guided toward the drive sprocket. As a consequence, it becomes possible to suppress vertical movements as would occur to the crawler belt when taken up onto the drive sprocket in a polygonally bent shape and to reduce the continuous striking noises generated by continues meshing engagement of the crawler belt and drive sprocket.

DETAILED DESCRIPTION OF THE INVENTION

Hereafter, the present invention is described more particularly by way of its preferred embodiments with reference to FIGS. 1 through 10 of the accompanying drawings.

Figure 1:
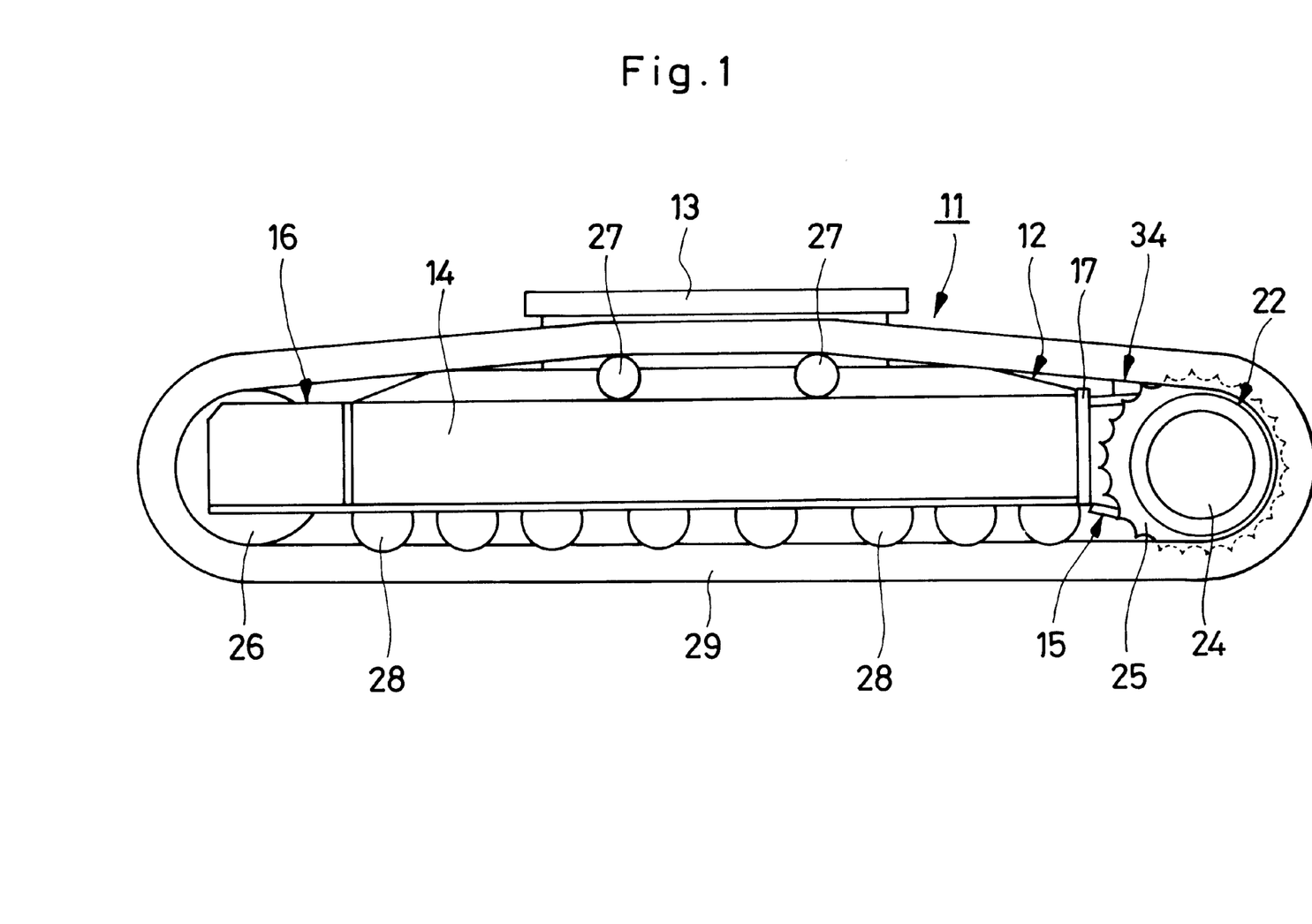
FIG. 1 is a schematic outer view of a base carrier incorporating the crawler type drive apparatus according to the present invention.

In FIG. 1, indicated at 11 is a base carrier of a hydraulic power shovel and at 12 a truck frame of the base carrier 11. The truck frame 12 includes a center frame 13 and a pair of longitudinally elongated side frames 14 (only one of which is shown in the drawings) which are located at the opposite lateral sides of the center frame 13.

At the front and rear ends of each side frame 14 a first bracket 15 and a second bracket 16 for drive sprocket and idler wheel are provided, respectively.

Figure 2:
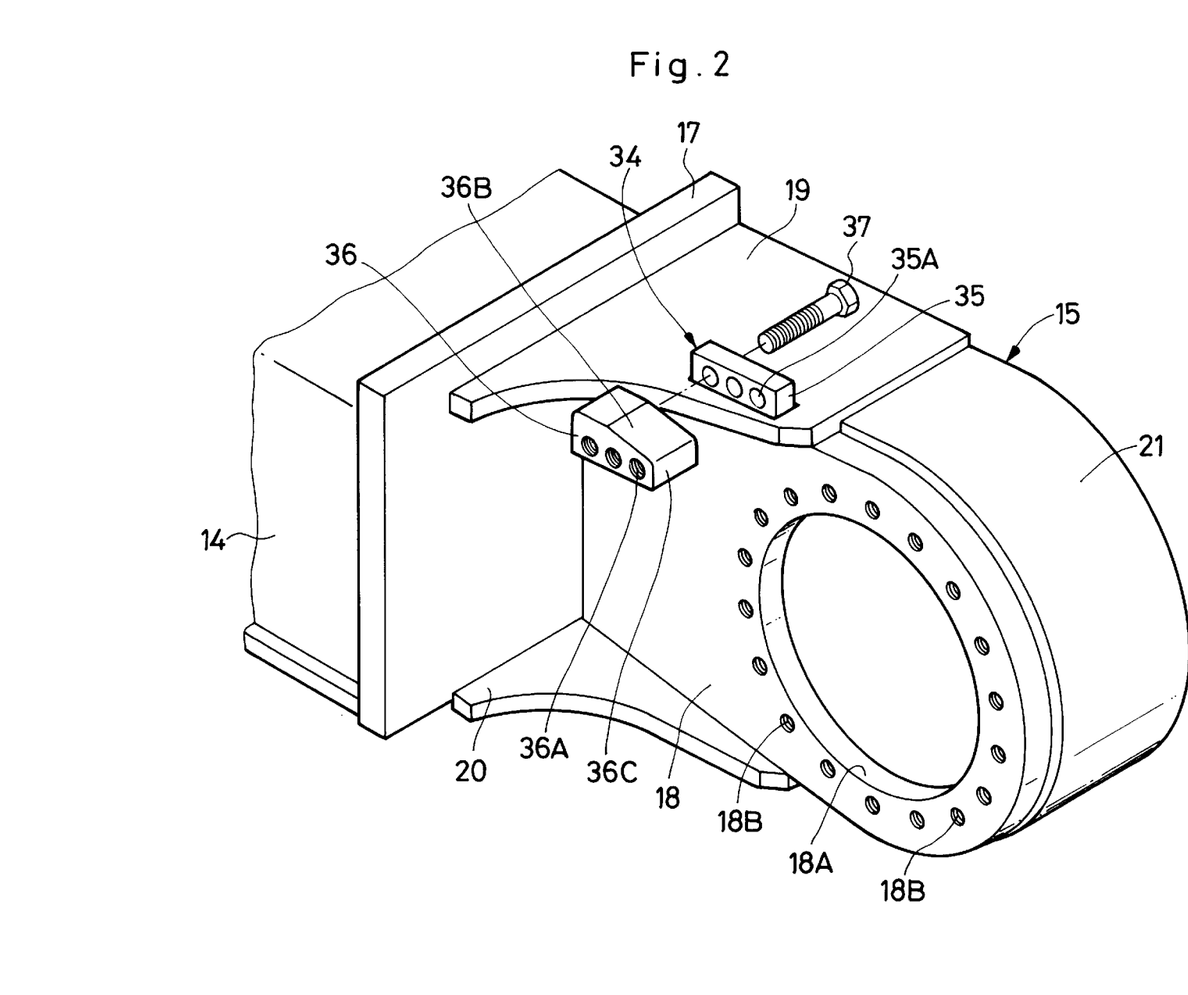
FIG. 2 is an enlarged perspective view showing, in a disassembled state, a bracket on the side of the drive sprocket and a crawler belt support block of FIG. 1.
Figure 3:
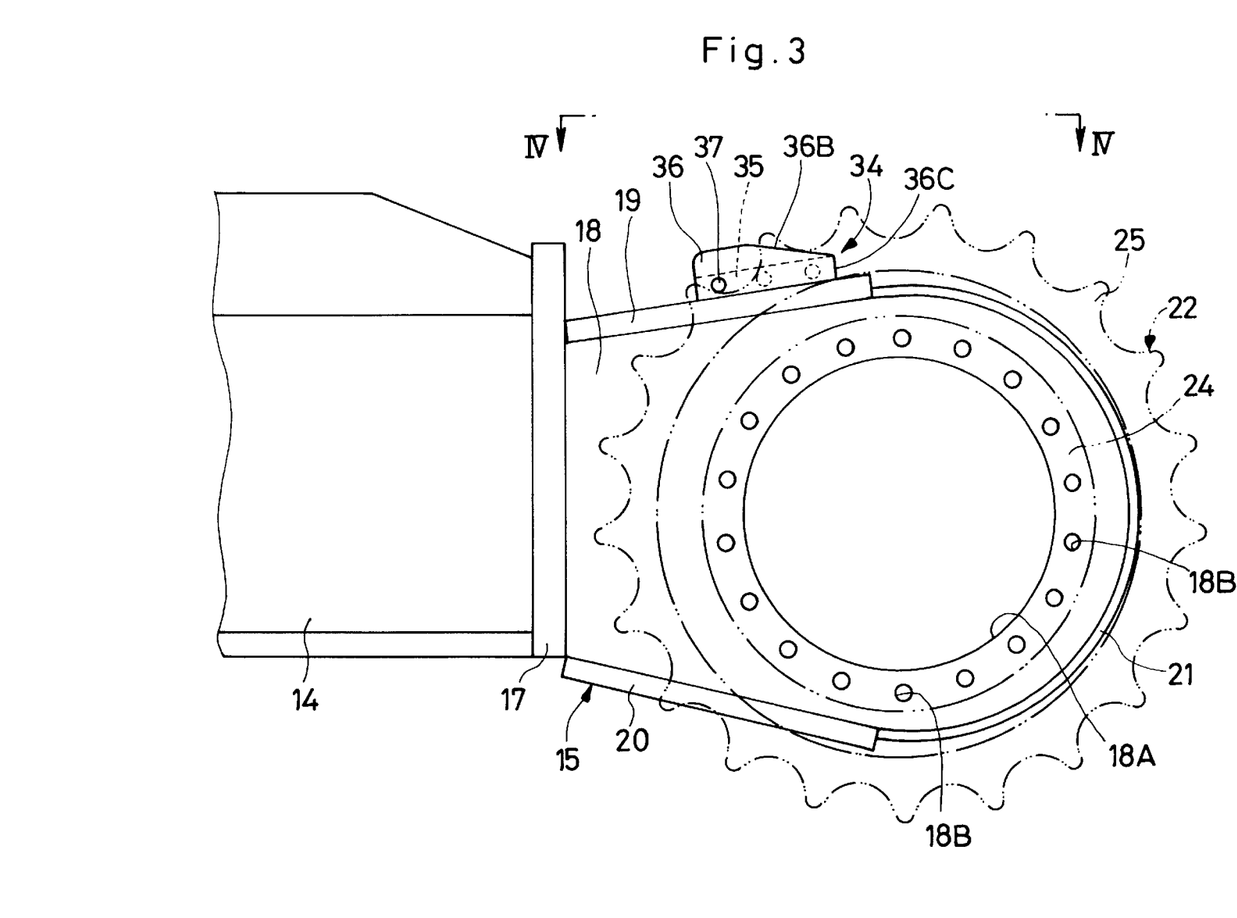
FIG. 3 is a fragmentary view showing, on an enlarged scale, the bracket on the side of the drive sprocket and the crawler belt support block, along with a drive mechanism which is indicated by two-dot chain line.
Figure 4:
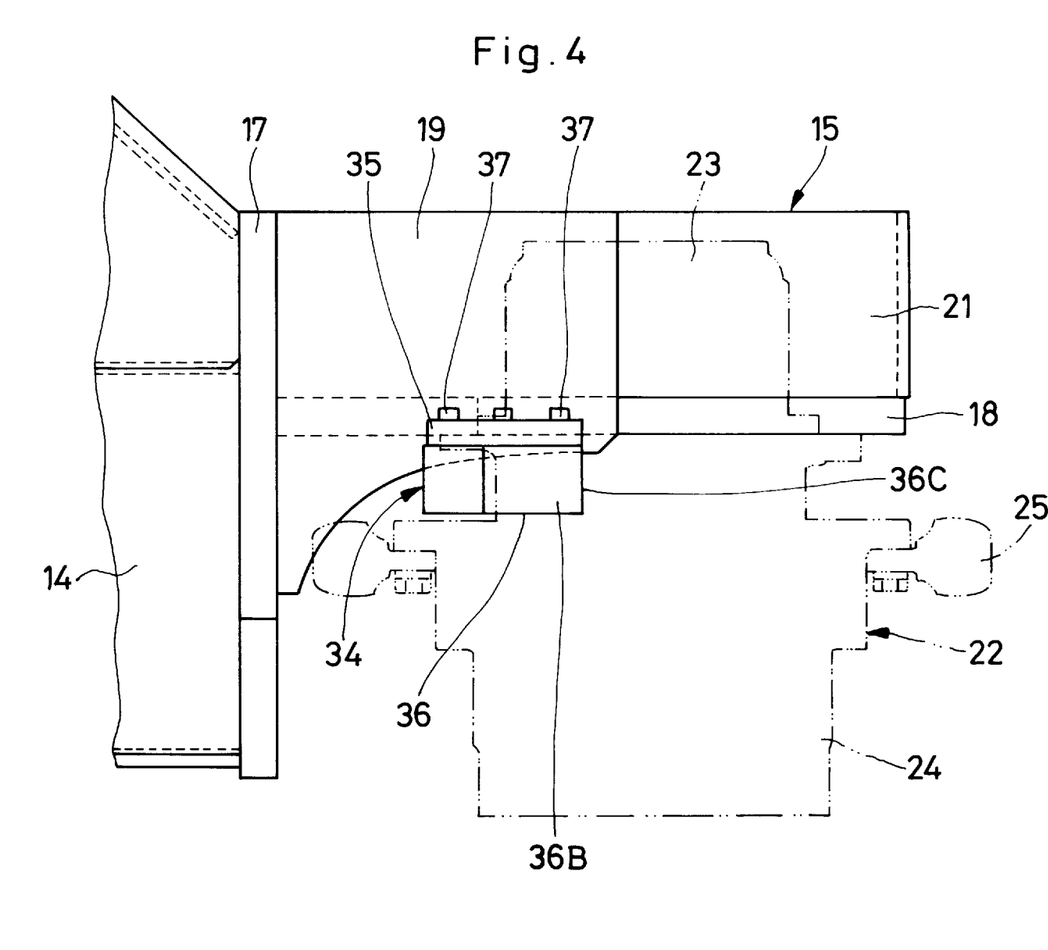
FIG. 4 is a plan view taken on line IV—IV of FIG. 3.

In the particular embodiment shown, as seen in FIGS. 2 to 4, the first bracket 15 is securely welded to a connecting end plate 17 which is in turn securely fixed to one end of the side frame 14.

The first bracket 15 is constituted by a thick mount plate 18 which is provided with a large number of screw holes 18B around a large-diameter bore 18A for mounting a drive motor 23 as will be described later, an upper reinforcing plate 19 which covers upper outer periphery of the mount plate 18, a lower reinforcing plate 20 which covers lower outer periphery of the mount plate 18, and a semi-circularly arcuate rear reinforcing plate 21 which is securely fixed to an outer peripheral side of the mount plate 18.

Designated at 22 is a drive mechanism which is mounted on the first bracket 15, the drive mechanism 22 including a drive motor 23, a reducer 24 for transmitting the rotation of the drive motor 22 in a reduced speed, and a drive sprocket 25 mounted on an output shaft of the reducer 24. As the drive sprocket 25 is rotationally driven from the drive motor 23 via the speed reducer 24, a crawler belt 29 is turned around between the drive sprocket 25 and an idler wheel 26 which will be described later.

Denoted at 26 is the just-mentioned idler wheel which is mounted on the second bracket 16 and which is constantly biased in a direction away from the drive sprocket 25 by a crawler belt tension adjusting mechanism (not shown) provided within the side frame 14, thereby imparting a suitable degree of tension to the crawler belt 29 which is passed around the drive sprocket 25 and idler wheel 26.

Indicated at 27 are a couple of upper rollers which are rotatably provided on the upper side of the side frame 14 to support the crawler belt 29 from beneath and to prevent the crawler belt 29 from contacting the side frame 14. Denoted at 28 are a plural number of lower rollers which are provided in a row on the lower side of the side frame 14 to support the side frame 14 over the crawler belt 29 between the drive sprocket 25 and idler wheel 26.

Designated at 29 is the crawler belt which is wrapped around the drive sprocket 25, idler wheel 26, upper rollers 27 and lower rollers 28. As shown particularly in FIGS. 5 and 6, the crawler belt 29 is constituted by a large number of links 30 which are successively connected into an endless form by means of connector pins 31. Each connector pin 31 is fitted with a cylindrical bush 32 on its circumference to be meshed with the drive sprocket 25, and fixedly provided with a plate-like shoe 33.

Figure 5:
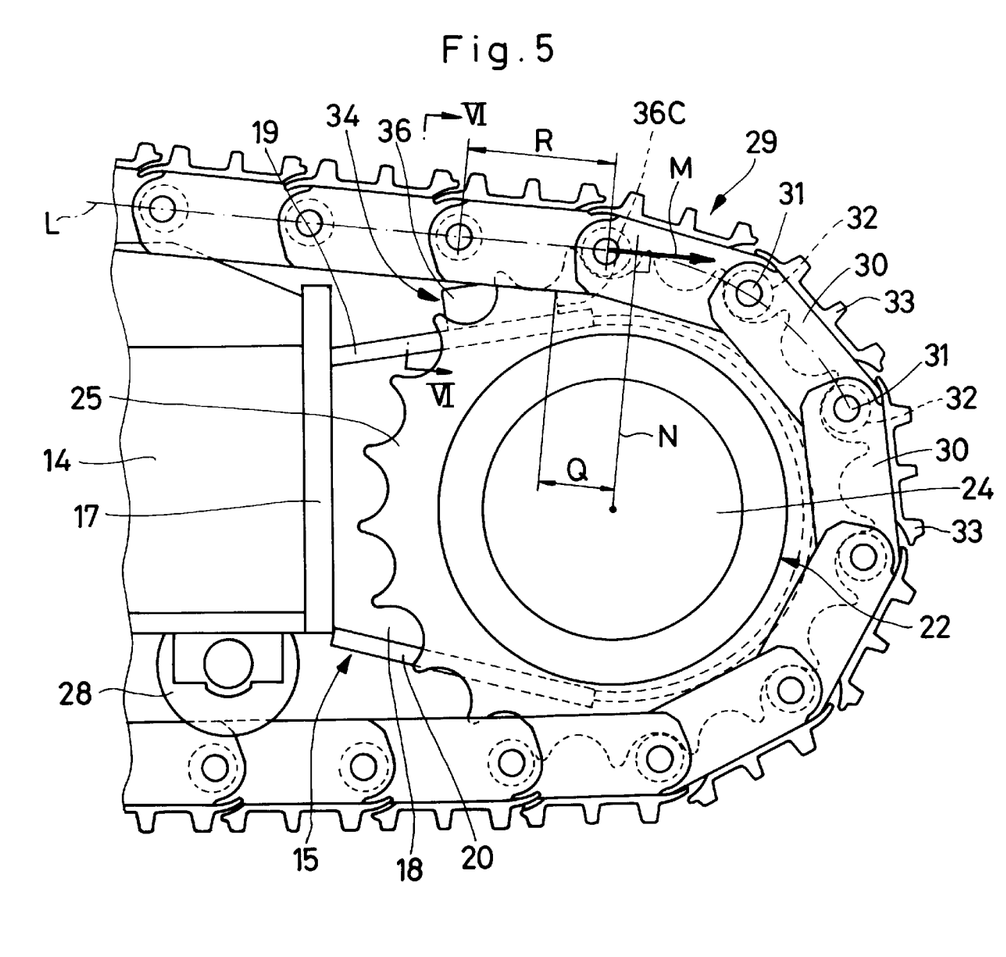
FIG. 5 is a fragmentary view showing, on an enlarged scale, the drive mechanism including the bracket on the side of the drive sprocket and the crawler belt support block of FIG. 1.
Figure 6:
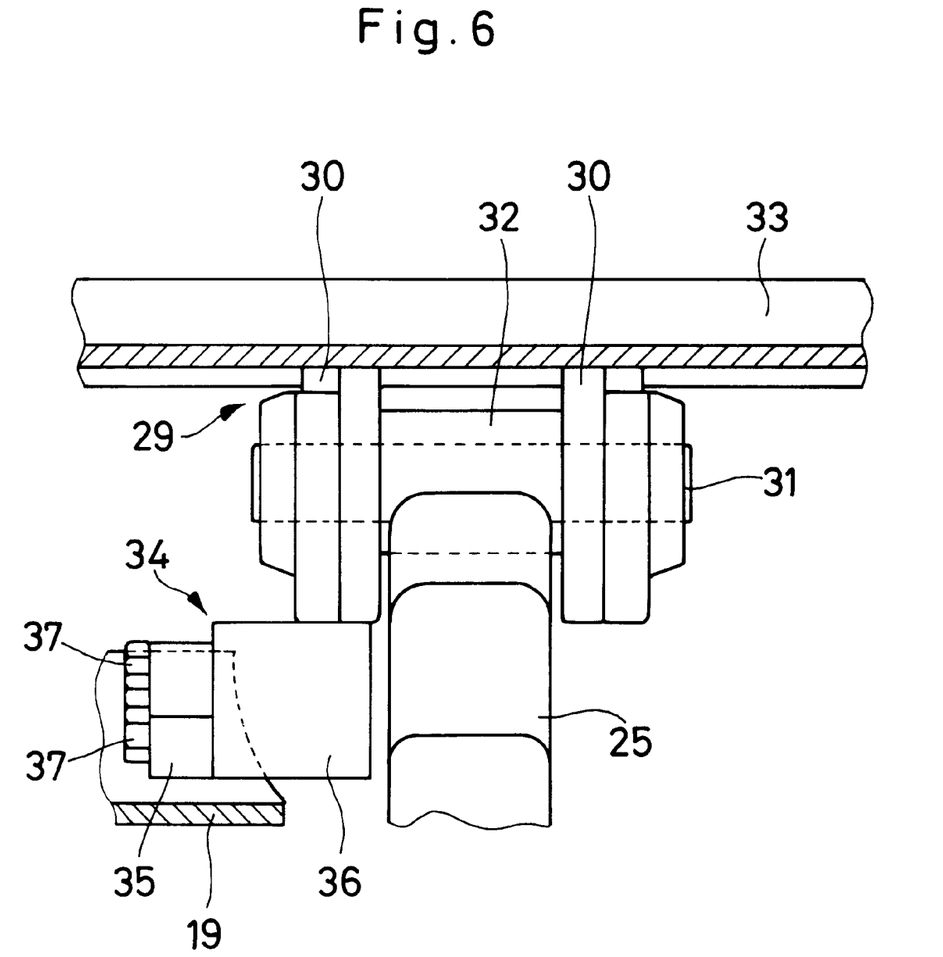
FIG. 6 is a schematic sectional view taken on line VI—VI of FIG. 5.

Denoted at 34 is a crawler belt support block which is provided on the first bracket 15 and in a position in the proximity of the drive sprocket 25. The crawler belt support block 34 is basically constituted by a base block 35 and a skid block 36 as will be described below.

The base block 35 is securely fixed by welding or other suitable means on the upper side of the upper reinforcing plate 19 which constitutes part of the first bracket 15, and is in the form of a rectangular steel block with three apertures 35A in the longitudinal direction.

The skid block 36 is securely fixed to the base block 35 and is substantially in the form of a trapezoidal steel block with three screw holes 36A in the longitudinal direction in the same pitch as the apertures 35A in the base block 35. The skid block 36 is tightly fastened to the base block 35 by bolts 37 which are threaded into the screw holes 36A in the skid block 36 through the apertures 35A in the base block 35.

Figure 7:
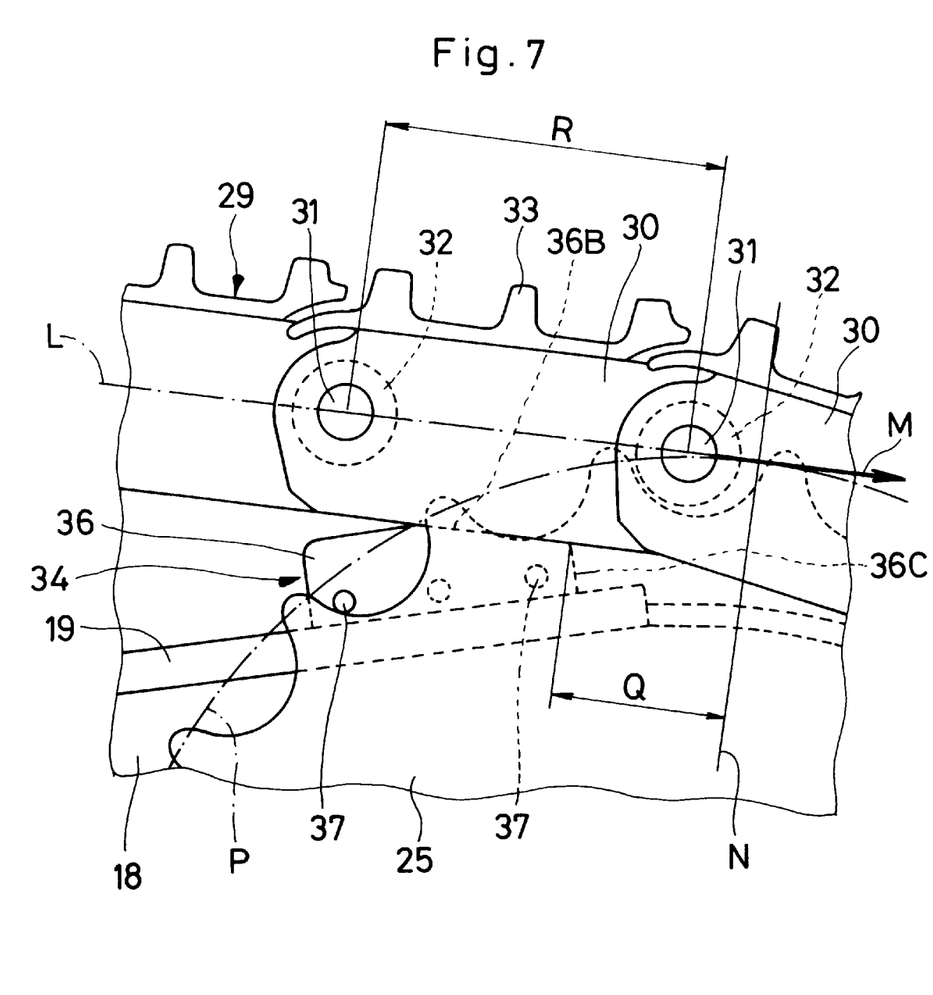
FIG. 7 is an enlarged fragmentary view of the crawler belt support block and associated components shown in FIG. 5.

Provided on top of the skid block 36 is a crawler belt sliding surface 36B which receives or intercepts vertical movements of the respective links 30 of the crawler belt 29 by sliding contact with lower surfaces of the links 30. As shown in FIG. 7, the crawler belt sliding surface 36B is formed substantially parallel with a line L which is tangential of the pitch circle P of the drive sprocket 25, that is, formed in the same direction as the crawler belt 29 being tangentially taken up onto the drive sprocket 25.

The skid block 36 is rounded off at its fore and rear ends to prevent same from being caught between connected ends of the links 30 while the respective links 30 of the crawler belt 29 are moving in sliding contact with the skid block 36.

Accordingly, lower surfaces of the respective links 30 of the crawler belt 29 are constantly held in sliding contact with the crawler belt sliding surface 36B of the skid block 36 to keep the crawler belt 29 in the tangential direction toward the meshing position where it is taken up onto the drive sprocket 25, thereby suppressing the continuous striking noises as would be generated in a louder level by the links of the crawler belt 29 which are coming into meshed engagement with the drive sprocket 25.

For a further study, a reference is had to the illustration of FIG. 7, where M is an extension line of the direction of movement of the crawler belt 29 being taken up onto the drive sprocket 25 tangentially along line L, N is a straight line which perpendicularly intersects the extension line M and at the same time passes through the center axis of the drive sprocket 25, Q is a spacing distance between the straight line N and an end 36C (a sprocket-side end) of the skid block 36 which is located on the side of the drive sprocket 25, and R is the pitch of the links 30 of the crawler belt 29. In this case, the space distance Q is set at value of 0.5 time the pitch R of the links 30 (Q=0.5R). Further, up to a point immediately upstream of an initial meshing position of the links 30 of the crawler belt 29 with the drive sprocket 25, the extension line M coincides with the tangential line L on the pitch circle P of the drive sprocket 25.

As seen in FIG. 7, the crawler belt sliding surface 36B of the skid block 36 is held in sliding contact with lower surfaces of the crawler belt 29, and thereby the crawler belt 29 is guided in a tangential direction up to a point immediately upstream of an initial meshing position of the crawler belt 29 with the drive sprocket 25.

In this embodiment with the arrangements as described above, the crawler belt 29 is wrapped around the drive sprocket 25, idler wheel 26, upper rollers 27 and lower rollers 28, and maintained in a suitably tensioned state by a crawler belt tension adjusting mechanism (not shown) which is provided between the idler wheel 26 and the side frame 14. In this state, upon rotationally driving the drive sprocket 25, the teeth of the drive sprocket 25 are successively meshed with the bushes 32 of the crawler belt 29, driving the latter to turn around to put the base carrier 11 of the vehicle in forward movement (in reverse direction).

Figure 8:
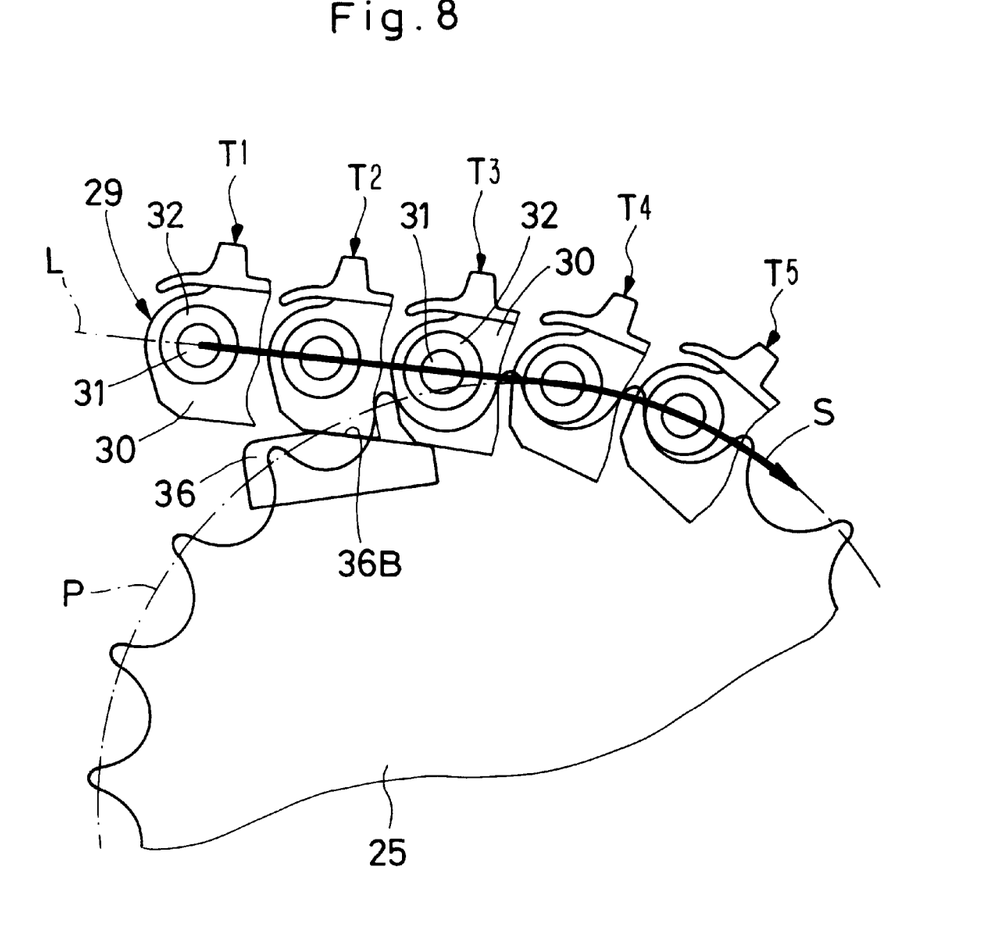
FIG. 8 is a schematic illustration explanatory of a manner in which links of the crawler belt of FIG. 7 are successively taken up onto the drive sprocket.

At this time, the skid block 36 which is provided on top of the upper reinforcing plate 19 of the first bracket 15 has its crawler belt sliding surface 36B constantly in sliding contact with lower surfaces of the respective crawler belt links 30 to sustain vertical movements of the links 30. As a result, while the respective links 30 are being progressively taken up onto the drive sprocket 25 between time points T1 to T5 as seen in FIG. 8, each bush 32 draws a smooth locus of movement as indicated by arrow S in such a way that a line passing through the centers of the respective bushes 32 is kept on the tangential line L relative to the pitch circle P of the drive sprocket 25.

Thus, the skid block 36 functions to guide the respective links 30 of the crawler belt 29 in such a way that links 30 are taken up onto the drive sprocket 25 constantly from a tangential direction. As a result, the skid block 36 suppresses vertical movements as would occur to the crawler belt 29 when taken up onto the drive sprocket 25 in a polygonally bent shape, thereby effectively diminishing the level of continuous striking noises which are produced by meshing engagement of the crawler belt 29 and the drive sprocket 25.

Besides, since the crawler belt holder block 34 is constituted by the base block 35 which is securely fixed on the upper reinforcing plate 19 on the first bracket 15, and the skid block 36 in the form of a singular solid body which is tightly fastened to the base block 35 by bolts 37, its construction can be simplified to a considerable degree as compared with the prior art counterparts using roller wheels. As a consequence, it becomes possible not only to realize a significant reduction in cost thanks to the reduction of the number of component parts, but to facilitate replacements of the skid block 36 in case it is worn out during use over an extended period of time.

Further, thanks to the use of the skid block 36 which consists of a single solid body, the crawler belt holder block 34 as a whole can be provided in a far smaller size as compared with holders using roller wheels. Consequently, it becomes possible to locate the skid block 36 extremely in the proximity of the drive sprocket 25 for the purpose of keeping the respective links 30 of the crawler belt 29 in sliding contact with the crawler belt sliding surface 36B up to a point immediately upstream of a position where the crawler belt 29 is taken up onto the drive sprocket 25. In addition, the crawler belt 29 can be advanced to and meshed with the drive sprocket 25 securely from a tangential direction to reduce more effectively the continuous striking noises which would be produced in a louder level at the time by meshing engagement of the bushes 32 of the crawler belt 29 with the drive sprocket 25.

Figure 9:
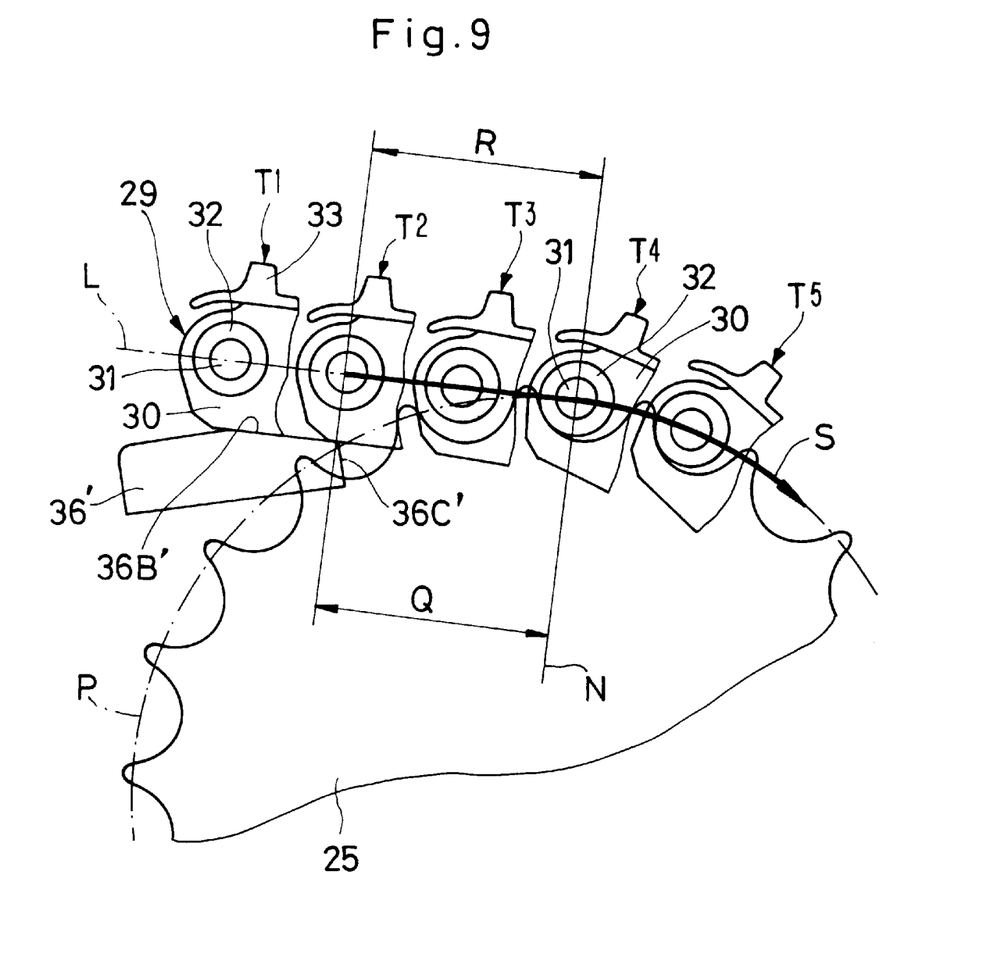
FIG. 9 is a view similar to FIG. 8 but showing a modification according to the invention.

Referring now to FIG. 9, there is shown a modification according to the present invention, in which the spacing distance Q of the sprocket-side end 36C' of the skid block 36' from the straight line N is set at a value equivalent to the pitch R of the crawler belt links 30 (Q=R).

Even in this modification with the arrangements just described, the crawler belt sliding surface 36B' of the skid block 36' is constantly held in sliding contact with lower surfaces of the respective links 30 to support the crawler belt 29 from beneath while the crawler belt 29 is being driven to turn around. Therefore, as shown in FIG. 9, when the respective links 30 are gradually taken up onto the drive sprocket 25 from time point T1 to T5, each bush 32 draws a smooth locus of movement as indicated by arrow S in such a way that a line through the centers of the respective bushes 32 is kept on the line L which is tangential to the pitch circle P of the drive sprocket 25.

Thus, under the guidance of the crawler belt support block 34, the crawler belt 29 is advanced toward and meshed with drive sprocket 25 substantially from a tangential direction. Consequently, the crawler belt support block 34 functions to suppress the vertical movements of the crawler belt 29 as would occur when the crawler belt 29 is taken up onto the drive sprocket 25 in a polygonally bent shape, thereby significantly diminishing the continuous striking noises resulting from meshing engagement of the respective bushes 32 of the crawler belt 29 with the drive sprocket 25.

Figure 10:
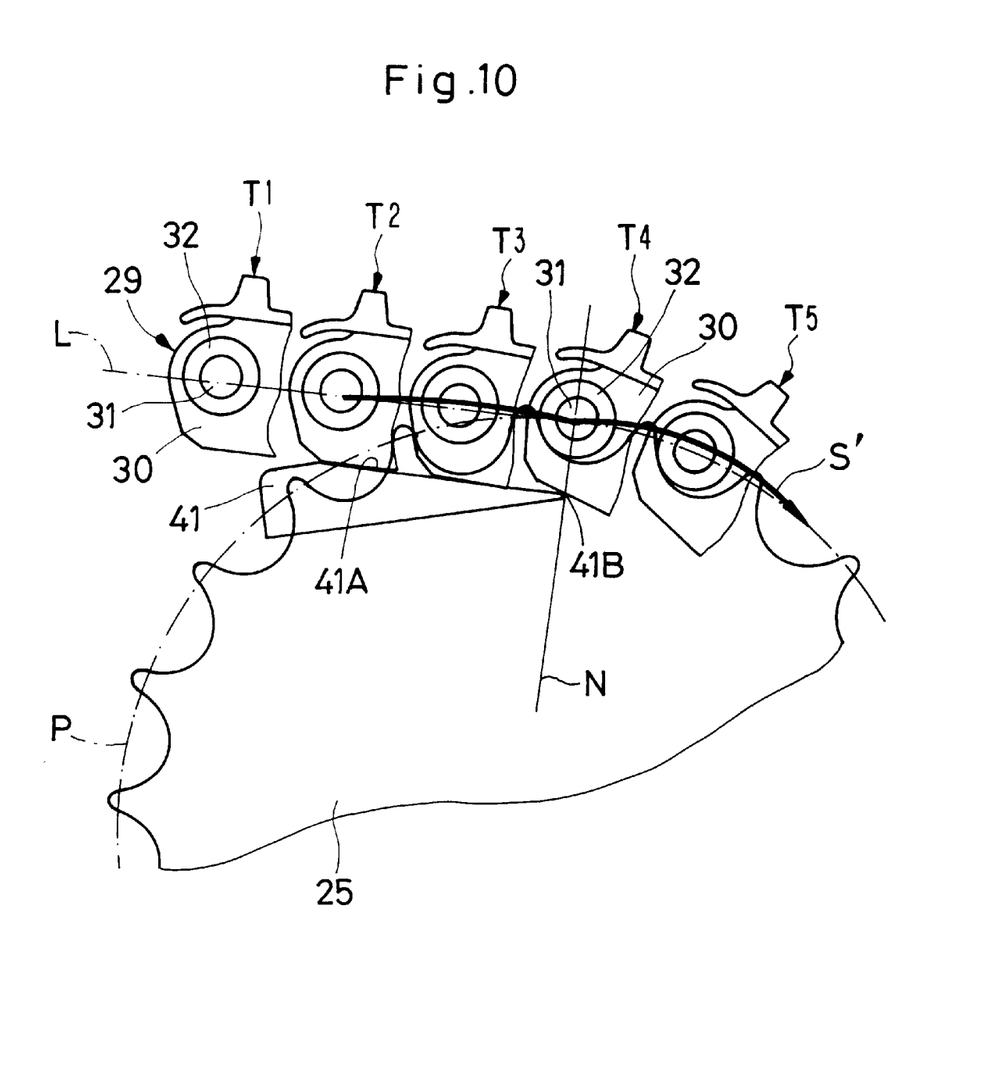
FIG. 10 is a schematic illustration explanatory of a lift-up phenomenon which occurs to the crawler belt in case one end of a skid block on the side of the drive sprocket is located on a straight line perpendicular to the direction of movement of a crawler belt advancing toward the drive sprocket.

In this regard, for the purpose of comparison, FIG. 10 shows an example employing a skid block 41 with a crawler belt sliding surface 41A which is elongated in the longitudinal direction up to a position where the spacing distance Q between the sprocket-side end 41B and the straight line N is zero (Q=0). In this case, however, a lift-up phenomenon occurs to a crawler belt portion which has been taken up onto the drive sprocket 25, due to the reasons as will be explained below with reference to FIG. 10.

In the case of FIG. 10, the skid block 41 is located in a position where the spacing distance Q between the sprocket-side end 41B of the skid block 41 and the above-mentioned straight line N is zero (Q=0).

In this instance, the links 30 which are moving in sliding contact with the crawler belt sliding surface 41A of the skid block 41 are taken up onto the drive sprocket 25 gradually from time point T1 to T5. At time point T4, the lower surface of each link 30 is brought into point contact with the sprocket-side end 41B of the skid block 41 and as a result caused to sway unsteadily about the contacting point of the sprocket-side end 41B, thereby giving rise to a lift-up phenomenon (floating-up phenomenon) to the bush 32 at the succeeding time point T5. As this time, while the link 30 is being taken up onto the drive sprocket 25, the bush 32 draws a locus of movement as indicated by a curve S'. Consequently, while the crawler belt 29 is being taken up onto the drive sprocket 25, the bushes 32 are caused to move up and down to produce louder continuous striking noises as they are meshed with the drive sprocket 25.

In addition, there is another problem that the point contact of the sprocket-side end 41B with the lower surfaces of the links 30 would accelerate wearing of the skid block 41 to a considerable degree.

Based on these observations, the present inventors conducted a study on the behaviors of the crawler belt in relation with the spacing distance Q between the sprocket-side end 36C of the skid block 36 and the straight line N, by adjusting the position of the skid block 36 in the forward and backward directions. As a result, it has been confirmed that the lift-up phenomenon of the bushes 32 on the teeth surface of the drive sprocket 25 can be suppressed to a practically tolerable level in case the spacing distance Q is set at a value of 0.25 times the pitch R of the crawler belt links 30 (Q=0.25R).

From these results, it has been established that, by setting the spacing distance Q of the skid block 36 in a range of 0.25 to 1 time the pitch R of the crawler belt links 30 (Q=0.25–1.0R), the continuous striking noises as generated by successive meshing engagement of the bushes 32 with the drive sprocket 25 can be reduced to a marked degree while preventing the above-mentioned lift-up phenomenon of the crawler belt 29 on the drive sprocket 25.

As explained above, according to the present invention, the crawler belt 29 is guided to advance toward and mesh with the drive sprocket 25 from a tangential direction, by means of the crawler belt support block 34 which is mounted on the upper reinforcing plate 19 of the first bracket 15 on the side of the drive sprocket, and which is arranged in such a way that the crawler belt sliding surface 36B of the skid block 36 is constantly held in sliding contact with lower surfaces of the respective crawler belt links 30. Consequently, it becomes possible to suppress vertical movements as would occur to the crawler belt 29 when it is taken up onto the drive sprocket 25 in a polygonally bent shape, and to reduce effectively the continuous striking noises which would otherwise be produced in a louder level by meshing engagement of the bushes 32 of the crawler belt 29 with the drive sprocket 25.

In this instance, the crawler belt support block 34 is constituted simply by the base block 35 which is securely fixed on the upper reinforcing plate 19 on the first bracket 15 on the side of the drive sprocket 25 and the skid block 36 which is removably fixed on the base block 35 by bolts 37, so that it is significantly simplified in construction, for example, as compared with the prior art counterparts which employ roller wheels to guide a crawler belt.

Consequently, the reduction in the number of component parts of the crawler belt support block 34 can be reflected by a significant reduction in the production cost of the crawler type vehicle drive apparatus as a whole. Besides, when in case the crawler belt support block 34 is worn out, it can be easily replaced simply by changing the skid block 36 which consists of a single solid body.

Moreover, by setting the spacing distance Q of the skid block 36 in the range of 0.25 to 1.0 time the pitch R of the crawler belt links 30, the skid block 36 can be located in a position in the proximity of the drive sprocket 25. Therefore, up to a point immediately upstream of the drive sprocket 25, the respective links 30 of the crawler belt 29 can be held in sliding contact with the crawler belt sliding surface 36B of the skid block 36. Accordingly, this embodiment can suppress all the more effectively the continuous striking noises as produced by the respective bushes 32 of the crawler belt 29 upon striking against the drive sprocket 25 at the time of meshing engagement therewith, while preventing the above-mentioned lift-up phenomenon of the crawler belt 29 on the drive sprocket 25.

In the above-described embodiment, the present invention has been shown by way of a crawler type drive apparatus which can serve as a base carrier of a hydraulic power shovel or the like. However, it is to be understood that the invention can be similarly applied to base carriers of hydraulic cranes or other crawler type drive apparatus.

As clear from the foregoing detailed description, the crawler belt support block according to the present invention is located on top of the first bracket on the side of the drive sprocket and constituted by a solid block body with a crawler belt sliding surface to be held in sliding contact with the crawler belt, thereby guiding the crawler belt in a direction substantially tangential of the drive sprocket when the links of the turning crawler belt are moved toward and successively taken up onto the drive sprocket. As a consequence, the crawler belt can be guided in such a way as to suppress its vertical movements as would occur when the crawler belt is taken up onto the drive sprocket in a polygonally bent shape, thereby reducing the continuous striking noises produced by meshing engagement of the crawler belt with the drive sprocket.

In addition, as mentioned before, the use of a block body with a crawler belt sliding surface makes the construction of the crawler belt support block very simple, for example, as compared with a crawler belt support using a number of roller wheels, thereby permitting to realize reductions in production cost of the crawler type drive apparatus as a whole and to improve the working efficiency in mounting or replacing a crawler belt block.

Further, according to the present invention, the first bracket on the side of the drive sprocket is constituted by a mount plate for a sprocket drive mechanism and a reinforcing plate for the mount plate, and the crawler belt support block is securely fixed on top of the reinforcing plate in a position in the proximity of the drive sprocket. Accordingly, the crawler belt can be guided in a tangential direction by sliding contact with the crawler belt sliding surface on the support block up to a position immediately upstream of an initial meshing point where the crawler belt meets the drive sprocket for meshing engagement therewith, thereby making it possible to reduce all the more effectively the continuous striking noises as generated by the crawler belt which is continuously taken up onto the drive sprocket.

Furthermore, according to the present invention, the crawler belt support block is constituted by a base block which is securely fixed on the first bracket on the side of the drive sprocket, and a skid block consisting of a singular rigid body which is detachably fixed on the base block, so that the crawler belt support block as a whole can be small-sized to a considerable degree, for example, as compared with the crawler belt support structures using roller wheels or the like. Therefore, the skid block can be located extremely in the proximity of the drive sprocket for the purpose of guiding the crawler belt in a tangential direction by the skid block up to a point immediately when the crawler belt is taken up on the drive sprocket. In addition, the above-described arrangements permit to replace a worn-out skid block easily in a facilitated manner.

Furthermore, according to the present invention, the crawler belt sliding surface on the crawler belt support block is formed substantially parallel with a tangential direction in which the crawler belt is to be taken up onto and meshed with the drive sprocket, so that, by sliding contact with the crawler belt sliding surface on the crawler belt support block, the crawler belt can be guided constantly in the tangential direction until it is taken up onto the drive sprocket.

Further, according to the present invention, a sprocket-side end of the crawler belt support block is located with a spacing distance in the range of 0.25 to 1 time the pitch of the crawler belt links from a straight line which is drawn through the rotational axis of the drive sprocket and perpendicularly to the direction of advancement of the crawler belt being taken onto the drive sprocket. As a consequence, the crawler belt is guided in the tangential direction up to a point immediately upstream of an initial meshing position where it is meshed with and taken up onto the drive sprocket, thereby securely reducing the striking noises as generated by continuous meshing engagement of the crawler belt with the drive sprocket while effectively preventing the lift-up phenomenon which would otherwise occur to the crawler belt after being taken up onto the drive sprocket.

Furthermore, according to the present invention, the crawler belt support block, which is located on the first bracket on the side of and in the proximity of the drive sprocket, is provided with a crawler belt sliding surface which is arranged to intercept vertical movements of the respective links of the crawler belt and at the same time to guide the links smoothly toward the drive sprocket in such a way as to keep the crawler belt links constantly in a tangential direction as they are taken up onto the drive sprocket. Accordingly, it becomes possible to suppress vertical movements which would occur to the crawler belts in a greater degree particularly in case it is taken up onto the drive sprocket in a polygonally bent shape, thereby reducing the continuous striking noises as generated by meshing engagement of the crawler belt and the drive sprocket.

What is claimed is:

1. A crawler type drive apparatus including a truck frame having a pair of side frames located at opposite lateral sides of a center frame, first and second brackets provided at the front and rear ends of each side frame for supporting a drive sprocket and an idler wheel or vice versa, and a crawler belt endlessly wrapped around said drive sprocket and idler wheel, characterized in that said crawler type drive apparatus comprises:

each bracket for said drive sprocket, being constituted by a mount plate for mounting a drive mechanism for said drive sprocket and a reinforcing plate located around an outer periphery of said mount plate, and securely fixed to an end of each said side frame through a connecting end plate; and a crawler belt support block provided on a top of said reinforcing plate at a position forward of said connecting end plate and in the proximity of a lateral side of said drive sprocket, said crawler belt support block being provided with a crawler belt sliding surface on an upper side thereof for sliding contact with said crawler belt.

2. A crawler type drive apparatus as defined in claim 1, wherein said crawler belt support block is constituted by a base block member securely fixed to an upper side of said reinforcing plate at a position on a lateral side of said drive sprocket, and a skid block in the form of a singular rigid block body detachably fastened to said base block member and having a crawler belt sliding surface on an upper side thereof for sliding contact with said crawler belt.

3. A crawler type drive apparatus including a truck frame having a pair of side frames located at opposite lateral sides of a center frame, first and second brackets provided at the front and rear ends of each side frame for supporting a drive sprocket and an idler wheel or vice versa, and a crawler belt endlessly wrapped around said drive sprocket and idler wheel, characterized in that said crawler type drive apparatus comprises:

each bracket for said drive sprocket being securely fixed to a connecting end plate, said connecting end plate being secured to an end of each said side frame and a crawler belt support block provided on top of said bracket on the side of said drive sprocket at a position forward of said connecting end plate and on a lateral side of said drive sprocket, said crawler belt support block being constituted by a base block member securely fixed to an upper side of said bracket at a position on a lateral side of said drive sprocket, and a skid block in the form of a singular rigid block body detachably fastened to said base block member and having a crawler belt sliding surface on an upper side thereof for sliding contact with said crawler belt.

4. A crawler type drive apparatus having a truck frame with a pair of side frames located at opposite lateral sides of a center frame, first and second brackets provided at the front and rear ends of each side frame for supporting a drive sprocket and an idler wheel or vice versa, and a crawler belt endlessly wrapped around said drive sprocket and idler wheel, characterized in that said crawler type drive apparatus comprises each bracket for said drive sprocket being securely fixed to a connecting end plate, said connecting end plate being secured to an end of each said side frame:

a crawler belt support block located on top of each said bracket for said drive sprocket on the side of said drive sprocket at a position in the proximity of a pitch circle and on a lateral side of said drive sprocket, said crawler belt support block being in the form of a block body having a length substantially the same as to a pitch of crawler belt links and provided with a crawler belt sliding surface on an upper side thereof for receiving vertical movements of respective crawler belt links while guiding said crawler belt smoothly therealong.

5. A crawler type drive apparatus as defined in any one of claims 1 to 4, wherein said crawler belt support block is located in an auxiliary spaced position from a lateral side of said drive sprocket, and said crawler belt sliding surface of said crawler belt support block is formed substantially parallel with a line tangential of said drive sprocket at a point at which said crawler belt is being taken upon to said drive sprocket to guide said crawler belt therealong until taken up onto said drive sprocket.

6. A crawler type drive apparatus as defined in claim 5, wherein an end of said crawler belt support block on the side of said drive sprocket is located with a spacing distance in the range of 0.25 to 1 time as large as a pitch of crawler belt links from a straight line passing through center axis of said drive sprocket perpendicularly to a travel direction of a crawler belt portion being taken up onto said drive sprocket.

7. A crawler type drive apparatus, comprising:

a truck frame having a center frame and a pair of side frames provided at opposite lateral sides of the center frame;

a first bracket provided at one end of each side frame;

a second bracket provided at another end of each side frame, opposite the one end;

a drive sprocket supported by each of the first brackets each bracket for said drive sprocket being securely fixed to a connecting end plate, said connecting end plate being secured to an end of each said side frame;

a drive motor for driving each of the drive sprockets;

an idler wheel supported by each of the second brackets;

a crawler belt endlessly wrapped around the drive sprocket and the idler wheel, the crawler belt comprising a plurality of links connected together by connector pins at a pitch R, and a cylindrical bush provided on the connector pin for meshing with the drive sprocket; and a crawler belt support block provided on top of said bracket for said drive sprocket and on a lateral side of the drive sprocket and having an upper crawler belt sliding surface on which a lower surface of the links of the crawler belt slide before the bushes of the links are taken up on the drive sprocket, the upper crawler belt sliding surface being substantially parallel with a line L tangential to a pitch circle P of the drive sprocket at a point at which one bush of the crawler belt is being taken up onto the drive sprocket, wherein an end of the sliding surface of the crawler belt support block closest to the drive sprocket is spaced a distance Q from a straight line N which passes through a center axis of the drive sprocket and perpendicularly intersects an extension line M of a direction of movement of the crawler belt being taken up onto the drive sprocket tangentially along line L, where Q=0.25R to 1.0R.

* * * * *